2,845,396

METHOD OF PRODUCING CELLULAR PHENOLIC RESINS USING ALIPHATIC ETHERS AS BLOWING AGENTS

Karl F. Krebs, West Caldwell, and Paul F. Urich, Upper Montclair, N. J., assignors to Union Carbide Corporation, a corporation of New York No Drawing. Application July 22, 1955
Serial No. 523,932

7 Claims. (Cl. 260—2.5)

This invention relates to improvements in the production of low-density multi-cellular or foam-like structures of thermoset phenol-formaldehyde resins.

Heretofore it has been known to prepare foamed structures by adding a sufficient amount of a suitable inorganic or organic acid to heat-reactive, phenol-aldehyde "A"-stage reaction products. The acid with or without the application of moderate heating causes the "A"-stage resin to react so vigorously and with sufficient exothermic heat to convert the water of condensation and any incidental water into steam. The steam, being more or less uniformly distributed through the resin, foams the hot resin into a frothy mass, and because of the rapid reaction, the resin heat-converts to an infusible condition before the froth can collapse to any substantial extent due to condensation of the steam.

It is also known to use in conjunction with the acids, water-soluble salts of carbonic acid such as sodium bicarbonate which liberate carbonic gas. It is further known that water-soluble surface active agents such as a polyethylene ether of a sorbitan mono ester of high molecular weight fatty acids are of advantage in producing cellular phenol-formaldehyde resin structures of maximum expansion, reference being had to the Nelson et al. U. S. Patent 2,446,429.

While the practice of the aforementioned and other prior art suggestions resulted in thermoset phenol-formaldehyde resin foamed structures of apparent densities between 0.3 to 20 pounds per cubic foot, such structures due to unequal and variable expansion effects during their formation contained numerous large voids or holes ranging in size from about 1/8" to 1" diameter and occasionally even larger being similar in appearance to the random large voids in natural sponges. The remainder of the cellular structures comprised relatively small but coarse spherical cells between 0.005 and 0.050 inch diameter. The large voids are areas of serious weakness when the cellular structures are used as a substitute for excelsior or similar packaging material. The voids also detract from the thermal insulating values of the structures when such use is made thereof.

It has now been found that foamed phenol-formaldehyde resin structures of apparent densities as low as 0.25 pound per cubic foot can be prepared which are substantially free of large voids (0.5 to 10 cubic inches) by incorporating in a substantially dehydrated, water-soluble, "A"-stage, thermosetting phenol-formaldehyde condensation product prior to the blowing step, a minor amount by weight of an aliphatic ether having a boiling point between about 30° C. and 100° C. and having the formula ROR' where R and R' each represent the same or a different alkyl group having up to 4 carbon atoms.

Aliphatic ethers having boiling points in excess of 100° C. tend to be erratic in their foaming behavior. For example, n-di-butyl ether in batch to batch operations occasionally yields coarse and non-uniform cellular products. With aliphatic ethers of still higher boiling points, such nonuniform structures become the rule rather than the exception. It is believed the erratic performance of the ethers boiling above 100° C. is probably due to the fact that their volatilization in adequate amount does not occur until the phenol-formaldehyde resin attains its maximum exothermic heat, at which stage the resin is so highly viscous that it is unevenly distended by the ether and other volatiles present. On the other hand, ethers boiling below 100° C. begin to volatilize almost from the start of the resin reaction and hence form uniform size bubbles within the resin while its viscosity is still relatively low, and in addition their vaporization tends to retard the catalytic reaction rate of the resin sufficiently to allow maximum expansion to occur prior to gelation of the resin. Ethers boiling below 30° C. are impractical to use in that satisfactory control of volatilization is difficult to secure in the absence of expensive cooling means.

Specific aliphatic ethers having boiling point below 100° C. and contemplated by the above formula and satisfactory in the practice of the present invention include the following:

Diethyl ether                Methyl propyl ether
n-Butyl ethyl ether          Diisopropyl ether
Tert-butyl ethyl ether       Di-n-propyl ether
Isobutyl methyl ether        Ethyl isobutyl ether
n-Butyl methyl ether         Ethyl isopropyl ether
Isopropyl methyl ether       Ethyl propyl ether No complete explanation is presently possible as to why an aliphatic ether of the type herein described having a boiling point between 30° and 100° C. produces foamed phenolic resin structures of finer and more uniform texture (smaller cell size) particularly in view of the fact that other volatile solvents, for example water, alcohol, acetone or ethyl acetate which have boiling points within the range of the useful ethers, have been found unsuitable in this connection. Ethyl alcohol yields a predominantly coarse cellular structure; acetone a variable structure of fine and coarse cells, and water gives structures of higher density, blow-holes and more or less non-uniform porosity.

The phenomenon appears to be related to possible complex formation between the ether and the acid, since it has been observed that when the ether and acid are initially mixed together and the solution then aged for 24 hours to 48 hours at room temperature, such acid-ether solutions when added to the phenolic resin produce foamed structures of more uniform cellular texture than when a fresh solution of the acid and ether is added to the resin, or acid to a solution of the phenolic resin in the ether.

In most cases it has been found desirable to mix the ether and acid together, and then to add the mixture or solution with rapid stirring to the phenolic resin. This procedure facilitates fast and uniform dispersion of the acid in the phenolic resin. The need for rapid dispersion of the acid becomes self-evident upon the realization that the acid, and particularly in the instance of the stronger mineral acids such as sulphuric or hydrochloric when added to the resin which is usually at room temperature (20–35°) and never over 65° C., causes an almost immediate reaction, foam being formed at once, and the foam hardening to an infusible mass oftentimes in less than 30 seconds after the addition of the acid. Moreover, such rapid dispersion or stirring tends to aerate the mixture, the contained air bubbles apparently functioning as "seeds" for the foam formation.

The amount of ether required to develop uniform cell structure is somewhat critical. While as little as 0.5 percent of ether on the weight of the resin imparts a definite improvement, the best results were obtained with an ether content between about 3 and 8 percent on the weight of the resin. When more than 10 percent by weight of ether is used, and particularly with the more volatile ethers such as diethyl ether and diisopropyl, there is a decided tendency for large blow-holes to form in the foamed structure due to excessive content of ether vapors.

The phenolic condensation products useful in the practice of this invention are the water-soluble, alkaline-catalyzed "A"-stage reaction products of formaldehyde with monohydric phenols, such as phenol, meta cresol, and meta xylenol which have three reactive positions on the ring or mixtures of monohydric phenols such as phenol and ortho cresol averaging more than two reactive positions on the phenolic ring. The lowest density foamed structures (0.2 pound per cubic foot) have been obtained when condensation products were used based on 1.3 to 1.6 mols of formaldehyde reacted per mol of phenol. Phenolic condensation products in which more than 1.6 mols and up to 3 mols of formaldehyde have been reacted with the phenol tend to release loosely bound formaldehyde during the acid-catalyzed reaction. Since this release of formaldehyde is an endothermic type of reaction, it correspondingly reduced the amount of exothermic heat of reaction caused by the acid catalyst. Therefore, there is less heat available for vaporizing the volatile matter in the reaction mixture, whereby a lower degree of expansion occurs resulting in cellular structures of higher apparent densities, e. g., 2 to 20 pounds per cubic foot. On the other hand, "A"-stage condensation products having a reacted formaldehyde ratio between 1.0 and 1.2 mols per mol of phenol tend to harden before maximum expansion can occur, and have less exothermic heat; this is reflected by a somewhat higher density of the foamed structures made therefrom.

As alkaline catalysts of the initial phenol-formaldehyde reaction, any of the conventional catalysts are useful for example alkali and alkaline earth hydroxides or oxides such as sodium hydroxide, potassium hydroxide and magnesium oxide are useful. Ammonium hydroxide and the amines, for example diethyl amine, ethylene diamine and the like are also satisfactory. The reaction of phenol and formaldehyde in the presence of an alkaline catalyst is carried out to at least the phenol-alcohol stage. The reaction can be continued further, however, to form water-soluble resins as is described in the Bender U. S. Patent 2,034,457 and the Meharg U. S. Patent 2,190,672. The phenol-formaldehyde resins described in these patents are of general utility in the practice of the present invention, providing they have been dehydrated to a water-content not in excess of about 10 percent by weight as determined by the Karl Fischer method and furthermore are soluble in at least an equal weight of water.

A water-content of more than 10 percent in the resin is detrimental in that it absorbs too much exothermic heat in the acid catalyzed blowing step, and thus less expansion takes place whereby undesirably high apparent density products of non-uniform texture and large voids are obtained. When cellular structures of very low apparent density (0.2 to 2.0 pounds per cubic foot) are to be made, a water-content less than 5 percent in the "A"-stage reaction product has been found necessary.

Sulphuric acid and hydrochloric acids are the preferred mineral type acids for catalyzing the blowing reaction. Nitric acid is operable, but somewhat dangerous in that explosive picrates are liable to form. Phosphoric acid alone does not impart a vigorous enough blowing reaction, and therefore is preferably used in admixture with, for example, about an equal quantity of sulphuric acid or hydrochloric acid. In this connection however it has been found that cellular structures containing as little as 0.5 to 1.0 percent by weight of phosphoric acid do not support combustion, in the sense that after being ignited by an external flame, and such flame being thereafter removed, the burning cellular structure will self extinguish.

Relatively few organic acids have been found to impart a fast enough exothermic action to form a desirable cellular structure. Of these, the water-soluble aromatic sulfonic acids such as ortho- or para-phenolsulfonic acid and the isomeric toluenesulphonic acids give a reaction speed approaching the strong mineral acids.

Usually a 1 to 2 percent by weight quantity of a suitable strong acid on the weight of a neutral reaction mixture comprising the "A"-stage reaction product and a suitable ether or mixture of such ethers is an adequate amount for catalyzing the foaming and hardening reaction. A slightly larger amount may be required to compensate for the alkalinity of non-neutralized "A"-stage reaction products particularly those made with non-volatile alkaline catalysts such as sodium hydroxide.

The useful water-soluble, "A"-stage condensation products of phenol and formaldehyde for the purpose of this invention are in liquid form at room temperature, and preferably have a viscosity not in excess of about 60,000 centipoises at 25° C. to facilitate intimate and uniform mixing therein of the acid catalyst. While the ether can be initially mixed with the condensation product, before the acid is incorporated, it is preferred for the reasons heretofore given to first mix the acid and ether together and then to add this acid-ether mixture to the condensation product, when products of the lowest density are desired.

The invention is further illustrated by the following examples, showing the use of different ethers, and of phenolic condensation products made with different ratios of formaldehyde.

Example 1

A phenolic condensation product capable of producing cellular structures having apparent densities between 0.2 and about one pound per cubic foot was prepared by mixing together the following, all parts being by weight:

100 parts synthetic phenol
120 parts formalin (37% $CH_2O$)
3 parts barium hydroxide The mixture was reacted by heating at 70° C. for two hours, then cooled to 40° C. by applying vacuum, at which temperature it was neutralized by the addition of sulphuric acid. If the final resin after dehydration is to be stored for a considerable time before use, sufficient acid is added to attain a pH between 5.5 and 6.5 for optimum keeping qualities. Immediately after neutralization, the reaction mixture was vacuum dehydrated to a water content less than 5 percent by weight, the mixture during dehydration being held at a temperature of about 70 to 80° C. The product after dehydration is a viscous resin having a viscosity between 600 and 1000 centipoises at 25° C., and is soluble in at least an equal quantity of water.

Cellular structures were prepared from the resin of Example 1 by rapidly mixing together for about 20 seconds at room temperature the following, again all parts being by weight:

50 parts dehydrated phenolic resin (Example 1)
0.05 parts commercial polyethylene ether of sorbitan mono-palmitate
3.25 parts hydrochloric acid (37% strength)
3.0 parts aliphatic ether
0.5 part sodium bicarbonate and immediately pouring the mixture into an open-top square wooden box (20" x 20" x 20" internal dimensions) which served as a mold while the mixture foamed and set to a cellular structure in about 30 to 60 seconds. With diethyl ether, as the particular ether, a cellular structure was obtained having an apparent density of 0.6 pound per cubic foot; diisopropyl ether and n-dibutyl ether each yielded structures having apparent densities of 0.6 pound per cubic foot. Of these, the diisopropyl ether gave the most uniform cellular texture. All of these ethers however yielded structures which after removal from the mold and trimming of the block to a cubic foot in size were completely free of voids or blow-holes larger than 0.5 inch in diameter and on a cross-sectional area basis contained less than about 5 percent of such area in the form of cellular cavities larger than 0.25 inch in diameter.

Substituting 0.5 part of 96 percent strength sulphuric acid for the hydrochloric acid in the above formulations produced cellular structures of somewhat higher apparent densities in the instance of diisopropyl ether and n-butyl ether, being respectively 1.2 and 1.1 pounds per cubic foot. All the structures, as with those made with hydrochloric acid, were free of blow-holes or voids larger than 0.5 inch in diameter.

Substantially the same results were obtained when sodium bicarbonate was omitted from the formulation, and when other mono-esters of polyethylene ethers of sorbitan were employed, such as the mono-laurate and the mono-stearate. It may be noted here that the polyethylene ethers of sorbitan mono esters of long chain fatty acids which have been recognized as surface active agents can be desirably incorporated in the phenolic resin in amounts up to about 10 percent by weight of the resin. These surface-active agents tend to plasticize the final thermoset resin without unduly inhibiting the formation of the cellular structure.

*Example 2*

A phenolic resin of higher formaldehyde content and tending to yield cellular structures of medium densities (1.0 to 3.3 pounds per cubic foot) was prepared by reacting the following mixture, all parts being by weight:

100 parts synthetic phenol
170 parts formalin (37% $CH_2O$)
2 parts sodium hydroxide The mixture was heated for two hours at 80° C. and then cooled to about 40° C. in order to neutralize the alkaline catalyst with sulphuric acid. The neutralized reaction mixture was then dehydrated to a water content of four percent by weight by vacuum distillation at a temperature up to 60° C. and then immediately cooled to room temperature. The resultant product was a water-soluble, liquid resin having a viscosity of about 10,000 centipoises at 25° C.

This resin was mixed with aliphatic ether and acid in the same manner as described for the formulations based on the resin of Example 1.

With hydrochloric acid as the particular acid catalyst, diethyl ether produced a cellular structure from the resin of Example 2 having an apparent density of 1.4 pounds per cubic foot; diisopropyl ether, a structure of 1.0 pound per cubic foot; and n-dibutyl ether, a structure having 2.6 pounds per cubic foot. Substantially the same densities were obtained when sulphuric acid was used as the catalyst, with the exception that n-dibutyl ether in this case produced a cellular structure having an apparent density of 3.3 pounds per cubic foot.

The cellular or foamed products of this invention have particular utility as thermal or acoustic insulating materials. They can be used as insulating bats in refrigerators and other low-temperature insulating applications. They have moderate resistance to heat, sufficient to withstand prolonged exposures to temperatures not exceeding about 250° F. such as would be encountered in use of the material as an insulating jacket on hot-water heaters, and domestic steam boilers and low pressure steam piping and valves. Another use of the herein described cellular structures is as a packaging material for protecting and cushioning easily broken articles such as glassware and delicate instruments.

In general the practice of this invention enables one to obtain out of a single batch charge of resin, foamed structures of up to 50 cubic feet or more in size. These structures at a 50 cubic foot size when trimmed to remove surface irregularities such as result from adhesion to the mold surfaces, constitute between 75 and 85 percent of the original resin charge weight, and the trimmed block has less than five percent of its cells of a size larger than 0.25 inch diameter.

This application is a continuation in part of our copending application Serial No. 245,986, filed September 10, 1951, now abandoned.

What is claimed is:

1. Method of producing from phenol-formaldehyde condensation products cellular structures characterized by uniform texture and absence of blow-holes, which comprises incorporating, in an amount from about 0.5 to about 10 percent by weight of the condensation product, an aliphatic ether having the formula ROR' wherein R and R' each represent an alkyl group having up to four carbon atoms and a boiling point not in excess of about 100° C. in a liquid "A"-stage phenol-formaldehyde condensation product that has been dehydrated to a water content not in excess of 10 percent, said dehydrated product being soluble in at least an equal weight of water adding with rapid stirring a catalytic amount of a strong non-oxidizing acid whereby the condensation product reacts to produce a foamed cellular structure.

2. Method of producing from phenol-formaldehyde condensation products cellular structure having an apparent density less than 3 pounds per cubic foot and characterized by uniform texture and absence of blow-holes, which comprises dehydrating an "A"-stage phenol-formaldehyde condensation product to a water content not in excess of about five percent by weight, said dehydrated product being in liquid form at room temperature, and soluble in at least an equal weight of water, adding, in an amount from about 0.5 to about 10 percent by weight of the condensation product an aliphatic ether having the formula ROR' wherein R and R' each represent an alkyl group having up to four carbon atoms and a boiling point not in excess of about 100° C. to the dehydrated condensation product and adding thereto with rapid agitation a catalytic amount of a strong non-oxidizing acid whereby the condensation product reacts to produce a foamed structure.

3. Method of producing from phenol-formaldehyde condensation products cellular products characterized by uniform texture, absence of blow-holes, and resistance to combustion, which comprises rapidly mixing together a liquid "A"-stage, phenol-formaldehyde condensation product dehydrated to a water content not in excess of 10 percent, said dehydrated product being soluble in at least an equal weight of water, with an amount from about 0.5 to about 10 percent by weight of the condensation product of an aliphatic ether having the formula ROR' wherein R and R' each represent an alkyl group having up to four carbon atoms and a boiling point not in excess of about 100° C., a small amount of phosphoric acid, and a catalytic amount of a strong non-oxidizing acid whereby the condensation product reacts to produce a foamed structure.

4. Method of producing from phenol-formaldehyde condensation products cellular products characterized by uniform texture and substantial absence of blow-holes, which comprises incorporating in an "A"-stage phenol-formaldehyde condensation product in liquid form which product has been dehydrated to a water content not in excess of 10 percent, said dehydrated product being soluble in at least an equal weight of water, a mixture of an aliphatic ether having the formula ROR' wherein R and R' each represent an alkyl group having up to four carbon atoms and a boiling point not in excess of about 100° C. and a catalytic amount of a strong non-oxidizing acid whereby the condensation product reacts to form a foamed mass of low density, said ether being present in an amount from about 0.5 to about 10 percent by weight of the condensation product.

5. Method of producing from phenol-formaldehyde condensation products cellular structures characterized by uniform texture and absence of blow-holes, which comprises rapidly mixing together at room temperature a liquid "A"-stage phenol-formaldehyde condensation product dehydrated to a water content not in excess of 10 percent and being soluble in at least an equal weight of water, an aliphatic ether having the formula ROR' wherein R and R' each represent an alkyl group having up to four carbon atoms and having a boiling point between 30 and 100° C., said ether being present in amount between 3 and 8 percent by weight of said condensation product, and adding a catalytic amount of a strong non-oxidizing acid whereby the condensation product foams and sets to a cellular structure.

6. Method of producing from phenol-formaldehyde condensation products cellular structures characterized by uniform texture and absence of blow-holes which comprises rapidly mixing together a liquid "A"-stage condensate of one mol phenol and between 1.3 and 1.6 mols formaldehyde dehydrated to a water content not in excess of 10 percent and being soluble in at least an equal weight of water, an aliphatic ether having the formula ROR' wherein R and R' each represent an alkyl group having up to four carbon atoms and having a boiling point between 30 and 100° C., said ether being present in an amount from about 0.5 to about 10 percent by weight of the condensate and adding thereto with rapid agitation a catalytic amount of a strong non-oxidizing acid whereby the condensation product foams and thermosets to a cellular structure.

7. Method of producing from phenol-formaldehyde condensation products cellular structures characterized by uniform texture and absence of blow-holes which comprises rapidly mixing together a liquid "A"-stage condensate of one mol phenol and between 1.3 and 1.6 mols formaldehyde dehydrated to a water content not in excess of five percent and being soluble in at least an equal weight of water, an aliphatic ether having the formula ROR' wherein R and R' each represent an alkyl group having up to four carbon atoms and having a boiling point between 30 and 100° C., said ether being present in an amount from about 0.5 to about 10 percent by weight of the condensate, and adding thereto with rapid agitation a catalytic amount of a strong nonoxidizing acid whereby the condensate foams and sets to a cellular structure.

References Cited in the file of this patent

UNITED STATES PATENTS

| | | |
|---|---|---|
| 2,446,429 | Nelson et al. | Aug. 3, 1948 |
| 2,493,075 | La Lande et al. | Jan. 3, 1950 |
| 2,582,228 | Brinkema | Jan. 15, 1952 |